(12) United States Patent
Robertson

(10) Patent No.: US 6,866,540 B2
(45) Date of Patent: Mar. 15, 2005

(54) INDICIA-EQUIPPED ACTUATOR ASSEMBLY

(75) Inventor: Kenneth G. Robertson, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 8 days.

(21) Appl. No.: 10/418,924

(22) Filed: Apr. 18, 2003

(65) Prior Publication Data

US 2004/0209512 A1 Oct. 21, 2004

(51) Int. Cl.⁷ .............................................. H01R 3/00
(52) U.S. Cl. .................... 439/488; 439/700; 174/16.3; 165/185; 361/704
(58) Field of Search ..................... 174/16.3; 165/80.3, 165/185; 361/704, 707, 709, 710, 718–721; 439/267, 259, 488, 642, 700, 824

(56) References Cited

U.S. PATENT DOCUMENTS

| | | | | |
|---|---|---|---|---|
| 5,456,621 A | * | 10/1995 | Gan | 439/700 |
| 5,879,198 A | * | 3/1999 | Sekimori et al. | 439/700 |
| 6,338,646 B1 | * | 1/2002 | Hara et al. | 439/488 |
| 6,450,825 B1 | * | 9/2002 | Huang | 439/342 |
| 6,477,051 B1 | * | 11/2002 | Barsun | 361/704 |
| 6,545,879 B1 | * | 4/2003 | Goodwin | 361/807 |

* cited by examiner

*Primary Examiner*—Tho D. Ta
*Assistant Examiner*—James R. Harvey

(57) ABSTRACT

An indicia-equipped actuator assembly for removably coupling a CPU with a socket assembly, the actuator assembly comprising an engaging assembly for use in placing a socket assembly in an open or close position to couple or uncouple the CPU from said socket assembly; and an indicia portion for indicating whether the socket assembly is in an opened or closed position.

23 Claims, 5 Drawing Sheets

FIG._1

(Prior Art)

INDICIA-EQUIPPED ACTUATOR ASSEMBLY

TECHNICAL FIELD

The present invention pertains to an indicia-equipped actuator assembly for removably coupling a central processor unit (CPU) with a socket assembly.

BACKGROUND ART

Microcomputer components are often removably coupled with one another other by design. Thus, with reference to FIG. 1, a microprocessor board assembly 100 comprising heat sink 101 is removably coupled with a CPU (not visible) which is removably coupled to a socket assembly (also not visible), the coupled combination being removably coupled to board 102 by heat sink clamp 107 and heat sink mounting screws 106. A socket assembly 103 wherein the CPU and the heat sink have been uncoupled is visible.

In operation, and with reference to FIG. 1, an engaging assembly (not shown), on engaging and rotating socket element 104 in one position, will close socket assembly 103 to couple socket assembly 103 to the CPU. Similarly, the engaging assembly, on engaging socket element 104 and rotating it in an opposite position, will open socket assembly 103 to uncouple socket assembly 103 from the CPU.

As can be appreciated from inspecting FIG. 1, when heat sink 101 is coupled to the CPU and the unit is installed on board 102, access to socket element 104 is hindered; also it is difficult to visually determine whether socket assembly 103 is in an opened or closed position.

A prior art approach to improve access to socket element 104 when heat sink 101 is coupled to the CPU and the unit is installed over socket assembly 103, is to cut a recessed hole 105 in heat sink 101. Through recessed hole 105, a tool can be inserted to rotate socket element assembly 104 to place socket assembly 103 in either an opened or closed position with respect to the CPU.

A problem with the recessed hole 105 solution is that although engaging socket element 104 can be accessed and rotated, it is still not easy to visually determine whether socket assembly 103 is in an opened or closed position, as it is difficult to see down hole 105 in heat sink 101. Thus, a user intent on uncoupling the CPU from socket assembly 103 and not seeing the position of socket assembly 103 can unwittingly attempt to uncouple the CPU by uncoupling only readily visible heat-sink screws 106 in the mistaken belief that that screws 106 with heat sink clamps 107 are the only items coupling the CPU to socket assembly 103. Consequently, if in fact socket assembly 103 is in the locked position with respect to the CPU, the user on pulling on the CPU without unlocking socket assembly 103 will damage the CPU, socket assembly 103 and socket element 104.

In an alternative prior art solution for access to socket element 104 when heat sink 101 is coupled with the CPU and the unit is installed over socket assembly 103 is a low profile retention mechanism (not shown) attached to board 102. With this solution, a small flag (not shown) is attached on socket assembly 103 such that, on rotating socket element 104, the flag rotates over the top of socket assembly 103 to signal to the user that socket assembly 103 is either in an open or closed position.

A problem with the low-profile retention mechanism solution is that since the flag is attached to socket assembly 103, it is still difficult to see the flag when heat sink 101 and CPU are installed over socket element 104. Another problem with this solution is that since the low profile retention mechanism has to be machined or cast on board 102, this solution is expensive. A further problem is that this solution is limited in that it cannot be used with a variety of socket assemblies 103.

Accordingly, there is a need for a better solution for removably coupling a CPU with socket assembly 103 on board 102. There is also a need for a better solution to inform a user as to whether socket assembly 103 is in a locked and unlocked position. Further, there is a need for a solution that will work with a variety of socket assemblies 103. The present invention provides a novel solution to these needs.

These and other technical advantages of the resent invention will no doubt become obvious to those of ordinary skill in the art on reading the following detailed description of preferred embodiments in conjunction with the various Figures.

DISCLOSURE OF THE INVENTION

An indicia-equipped actuator assembly for removably coupling a CPU with a socket assembly, the actuator assembly comprising an engaging assembly for use in placing a socket assembly in an open or close position to couple or uncouple the CPU from said socket assembly; and an indicia portion for indicating whether the socket assembly is in an opened or closed position.

BRIEF DESCRIPTION OF THE DRAWINGS

The following Figures which are incorporated herein and form a part of this specification illustrate embodiments of the invention. Together with the description, they serve to explain the principles of the invention.

Figure 1:
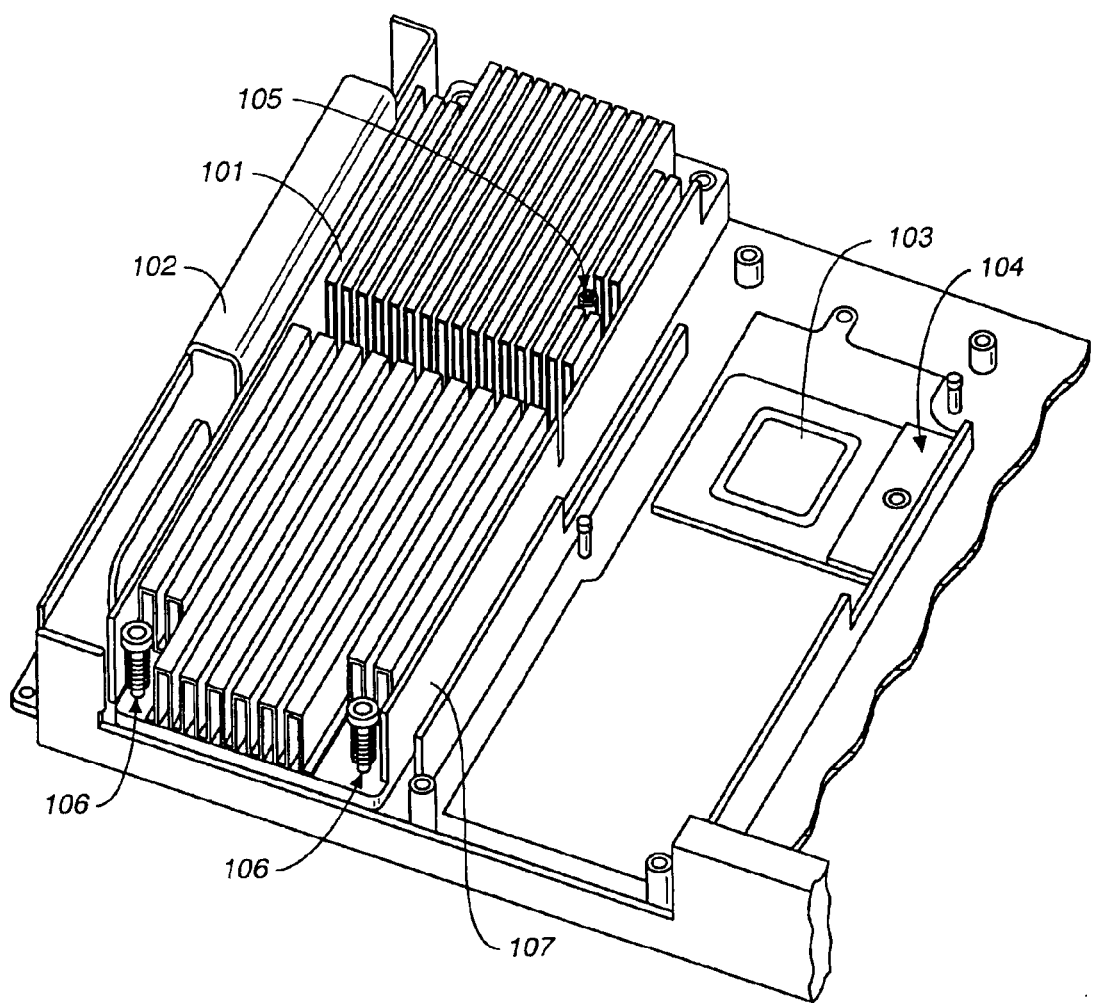
FIG. 1 is a view of CPU board assembly with stacked components.
Figure 2:
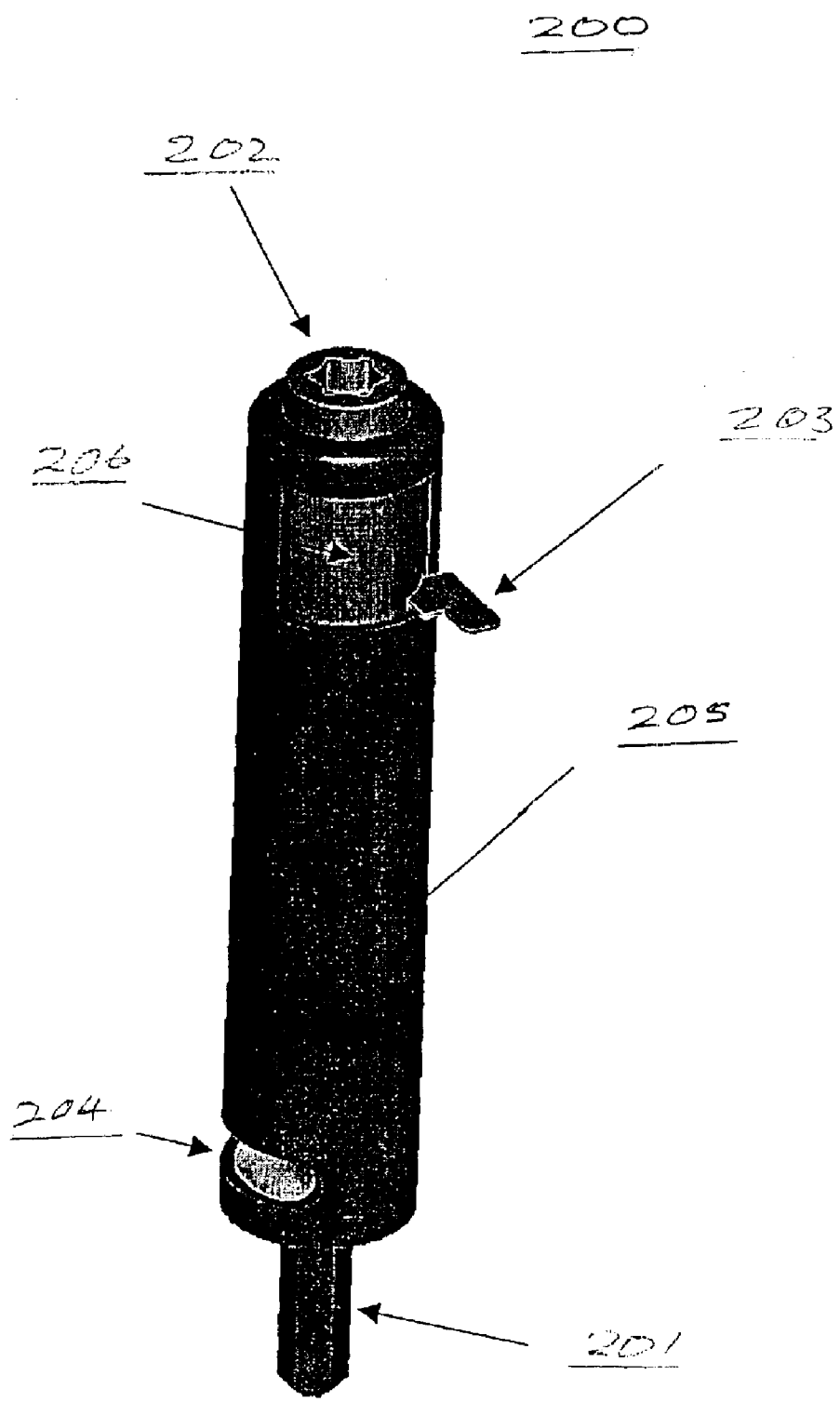
FIG. 2 is a view of an indicia-equipped actuator assembly in accordance with an embodiment of the present invention.
Figure 3:
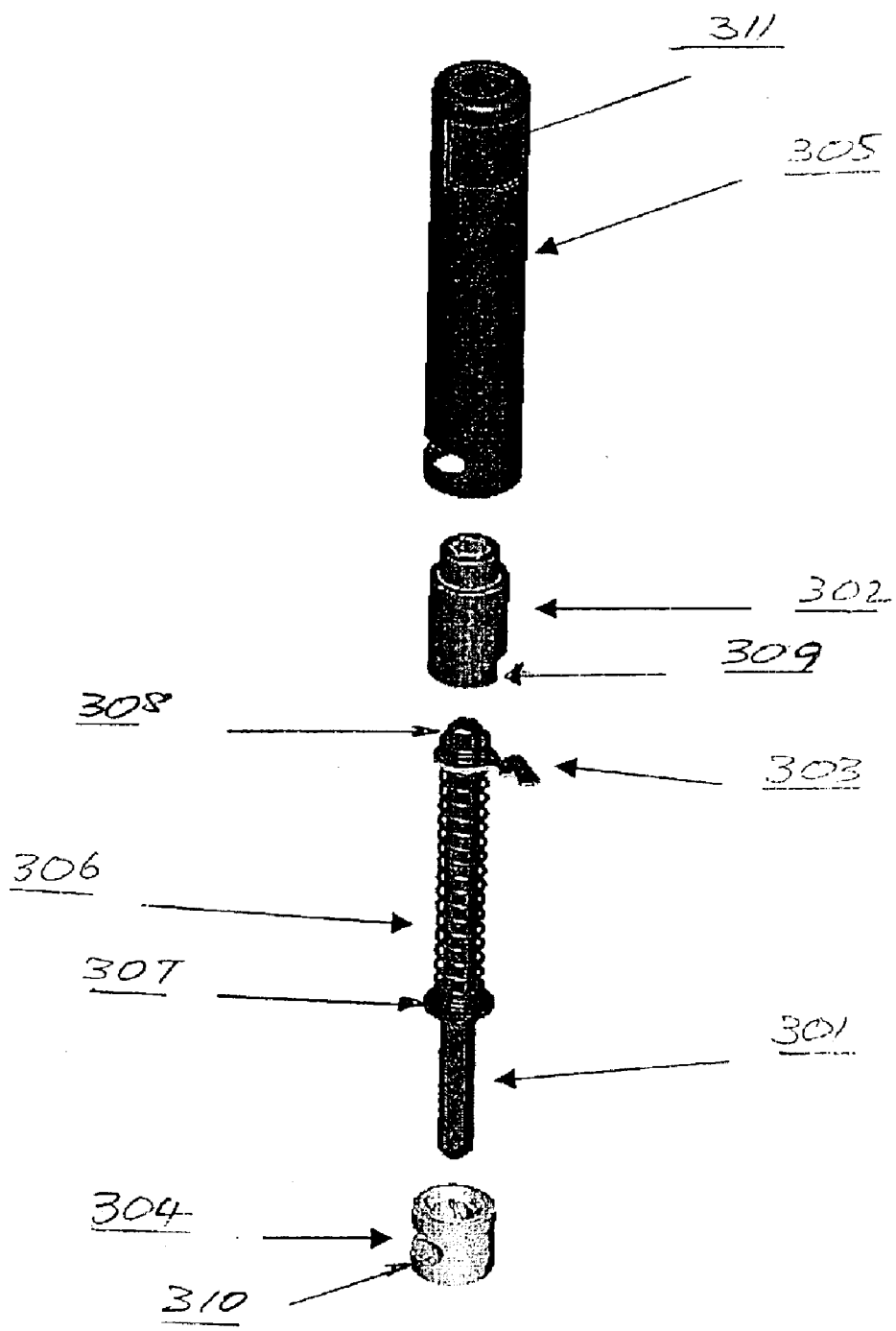
FIG. 3 an exploded view of an indicia-equipped actuator assembly in accordance with an embodiment of the present invention.
Figure 4:
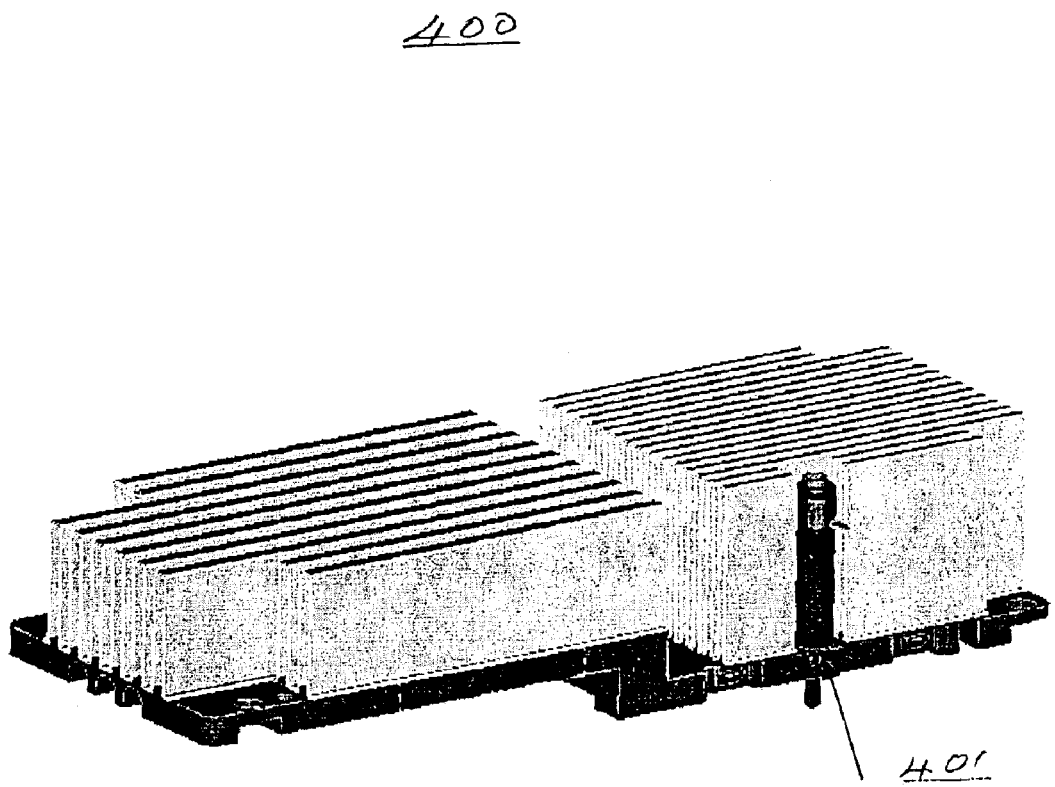
FIG. 4 is a view of an indicia-equipped actuator assembly in accordance with an embodiment of the present invention, removably attached to a heat sink assembly.

The drawings referred to in this description should not be understood as being drawn to scale except if specifically noted.

BEST MODE FOR CARRYING OUT THE INVENTION

Reference is now be made in detail to embodiments of the present invention, examples of which are illustrated in the accompanying FIGS. 1–5. While the invention is described in conjunction with these embodiments, it is to be understood that the invention is not limited to these embodiments. On the contrary, the invention is intended to cover alternatives, modifications and equivalents which are included within the spirit and scope of the invention as defined by the appended claims. Furthermore, in the following description of the invention, numerous specific details are set forth in order to provide a thorough understanding of the present invention. However, it will be understood by those of ordinary skill in the art that the present invention may be practiced without some of these specific details. In other instances, it will be understood that it is not necessary to describe in detail, well-known methods, procedures, components, and circuits to avoid unnecessarily obscuring aspects of the present invention.

The embodiments of the present invention are well suited for coupling and uncoupling a CPU with a socket assembly on a processor board assembly. The embodiments of the present invention, however, are not limited to such use but it is contemplated that they may also be used in other situations where access and visibility to components are restricted.

In overview, an embodiment of the present invention comprises an indicia-equipped actuator 200, 300 useable for coupling and uncoupling a CPU assembly with a socket assembly 103 through a socket element 104 on a microprocessor board assembly 100. It should be noted that embodiments of the present indicia-equipped actuator 200, 300 is useable with a variety of sockets, of which socket assembly 103 is exemplary.

With reference to FIGS. 1–4, the indicia-equipped actuator 200, 300 comprises an engaging assembly for engaging and placing the socket assembly 103 in an opened or closed position to couple or uncouple the CPU with the socket assembly 103; and an indicia portion 203, 303 for indicating whether socket assembly 103 is in an opened or closed position.

The engaging assembly includes a spring-loaded plunger 201,301, a cap 202, 302 and a sleeve 204, 304 all housed in a tube 205, 305 that cooperate as a unit to engage socket element 104, to open or close the socket assembly 103. The indicia portion 203, 303, in one embodiment, comprises a flag 203, 303 slidably mounted circumferentially on spring-loaded plunger 201, 301 for rotation in a plane perpendicular to the spring-loaded plunger 201, 301.

On employing the spring-loaded plunger 201, 301 to engage and rotate socket element 104 to open and close socket assembly 103, the flag 203, 303 will rotate with spring-loaded plunger 201, 301 in a range of up to about 90 degrees about the axis of the spring-loaded plunger 201, 301. However, it should be noted that rotating socket element 104 rotates a total of 180 degrees between the open and closed position. The cap 202, 302 defines an opening 309 at the bottom that is shaped to allow travel of the flag 203, 303 of only 90 degrees while the cap and plunger rotate 180 degrees. This is achieved because flag 203, 303 is trapped between opening 309 and the edge of window 206 defined by tube 205, 305. In one position, e.g. at 0 degree, the flag 203, 303 will alert the user that socket element 104 is an closed position; while in another position, e.g. at the 90 degree position, the flag 203, 303 will alert the user that socket element 104 is in a opened position. Additionally, flag 203, 303 in the 90 degree position will interfere with the installation of heat clamps 107 that secures heat sink 101 on the board 102.

Thus, by using the indicia-equipped actuator of the present invention, the user will be informed as to the position of the socket element 104 is thus not likely to unintentionally attempt to uncouple the CPU from the socket element 104 thereby causing damage to the CPU, socket assembly 103 and socket element 104, as with the prior art.

The following is a description the elements comprising the indicia-equipped actuator assembly in one embodiment 200, 300. This description is followed by a description of the operation of embodiment 200, 300 in conjunction with socket assembly 103 and socket element 104 for coupling and uncoupling socket assembly 103 with a CPU.

Referring to FIGS. 1–4, an embodiment of indicia-equipped actuator of the present invention comprises an engaging assembly 200, 300 for engaging and placing a socket assembly in an opened or closed position to couple or uncouple said CPU from the socket assembly; and an indicia portion 203, 303 for indicating whether the socket assembly is in an opened or closed position.

The engaging assembly comprises spring-loaded plunger 201,301, cap 202,302 and sleeve 204, 304 all housed in tube 205, 305 to form a cooperating unit to engage socket element 104, to open or close socket assembly 103.

Spring-loaded plunger 201,301 comprises a plunger 201, 301 (shaft), spring 306 and an oval-shaped element 307 disposed on the shaft 201, 301.

Shaft 201, 301 comprises a hex-shaped radial cross-section. The upper portion of shaft 308 is designed for engaging and disengaging the cap 302 by traveling in and out of a recess (not shown) in the bottom portion of the cap. In the middle portion of the shaft 201, 301 is spring 306 mounted on shaft 201, 301 for spring loading shaft 201, 301. Also in the middle portion of shaft is an oval-shape unit 307 for engaging a similar feature in sleeve 304. The lower portion of shaft 201, 301 is chamfered for engaging with socket element 104 when indicia-equipped indicator 200, 300 is installed on a mounting surface e.g. on a side portion of heat sink assembly 401. It should be noted that the chamfer at the bottom of plunger 210, 301 allows mating to different sockets that have different locations of rotating socket element 104, thus allowing for an embodiment of indicia-equipped actuator 200, 300 to work on a variety of sockets of which socket assembly 103 is exemplary.

Spring 306 is a helical spring concentrically mounted around a middle portion of the spring-loaded plunger 201, 301 for biasing spring-loaded plunger 201, 301 into a recess in the bottom portion of cap 202, 302.

Oval-shaped element 307 is disposed concentrically on spring-loaded plunger 201,301 below spring 306. Oval-shaped element 307 supports spring 306 and serves to orient spring-loaded plunger 201, 301, by engaging sleeve 304, for insertion of spring-loaded plunger 201, 301 into socket element 104. The outer dimension of oval-shape element 307 on plunger 201, 301 is smaller than the inner diameter of tube 205, 305 by such an amount as to allow lateral movement of plunger 201, 301 by about 0.7 mm.

When installing the CPU heat sink assembly into socket 103, oval-shaped element 307 operatively disengages with a similar mating oval-surface in sleeve 204, 304 to allow for spring-loaded plunger 201, 301 to rotate when the chamfered portion of plunger 210, 301 is inserted into socket element 104 to open or close socket element 104.

When removing the CPU heat sink assembly from socket 103, oval-shaped element 307 reverts back to engage a similar mating oval-shaped surface in sleeve 204, 304.

Cap 202,302 is disposed concentrically over a top portion of spring-loaded plunger 201, 301. Cap 202, 302 comprises a top portion, a shoulder portion, a bottom portion and side-wall portion.

The top portion of cap 202, 302 defines a Torx T 15 recess therein for concentrically engaging a standard Torx T15 tool and for rotating spring-loaded plunger 201, 301 to open or close socket assembly 103 by engaging socket element 104. An advantage of cap 202, 302 having a Torx T 15 recess is that the other fasteners in the computer also have the same recess; consequently service personnel do not have to use more than one screwdriver.

The shoulder portion of cap 202, 302 is in communication with tube 205, 305 for allowing the top portion of cap 202, 302 to protrude through an opening defined in tube 205, 305.

The bottom portion of cap 202, 302 defines a hex-shaped cross-section recess therein for concentrically engaging the top portion of spring-loaded plunger 201, 301 and for rotating spring-loaded plunger 201, 301 to open or close socket assembly 103 by engaging socket element 104.

The sidewall portion of cap 202, 302 defines an opening 309 at a bottom edge portion on cap 202, 302 for allowing up to 90 degree movement of indicia portion 303 e.g. a flag 303, mounted on spring-loaded plunger 201, 301 between open and closed positions of socket assembly 103. Other useable indicia include icons, and equivalents thereof which can be viewed through window 206 in the side of tube 205, 305.

Sleeve 204, 304 is an element disposed around a bottom portion of spring-loaded plunger 201, 301. Sleeve 204, 304 comprises an oval-shaped element defined by sleeve 204, 304 inner diameter for receiving spring-loaded plunger 201, 301 and for mating with an identical oval-shaped element 307 on spring-loaded plunger 201, 301 upon insertion of spring-loaded plunger 201, 301 in socket element 104. It should be noted that embodiments of the present actuator 200, 300 can be used in a variety of socket assemblies 103 including socket assembly 103, wherein the distance between the contacts of the socket that mate with the CPU pins (not shown) and the rotating socket element 104 varies by up to 0.7 mm. It should be noted that the oval shape in sleeve 304 and oval shaped element feature 307 in plunger 201, 301 are there not only to keep flag 203, 303 orientation in one position or the other, but also keep plunger 201, 301 in a ready-to-install position when first mating the CPU heat sink assembly 101 on to socket 103. The oval slot in sleeve 304 is used not only for orientation but allows the plunger 201, 301 to move laterally though this slot when the socket is opened or closed. Sleeve 204, 304 also comprises a notch 310, defined in the sidewall of sleeve 204, 304 for engaging sleeve 204, 304 with mounting surface 401 through a matching notch in a sidewall of tube 205, 305.

Tube 205, 305 is disposed concentrically around spring-loaded plunger 201, 301 and encases cap 202, 302, spring-loaded plunger 201, 301, spring 306, indicia portion 303 (e.g. flag) and sleeve 204, 304. Tube 205, 305 comprises top-wall and side-wall portions. Side-wall portion defines a window 206, 311 for viewing locked and unlocked icons (not shown) on cap 202, 302, and through which the flag 203, 303 protrudes to identify the position of socket assembly 103. Tube 205, 305 also includes a notch 204 corresponding to the notch 310 in the sidewall of sleeve 204, 304 for attaching actuator assembly 200, 300 to a mounting surface. Mounting surface includes surface 401 on heat sink 101.

The top portion of tube 205, 305 defines an opening through which the top portion of the cap 202, 302 protrudes. Thus, once spring-loaded plunger 201, 301 engages socket element 104, and spring 306 is compressed, spring-loaded plunger 201, 301 will travel up into cap 202, 302 for engagement with cap 202, 302. In this position, a rotation of cap 202, 302 will rotate spring-loaded plunger 201, 301.

Indicia portion 303 (e.g. a flag) is radially mounted on spring-loaded plunger 201, 301 between the upper portion of spring 306 and cap 202, 302. Flag 303 is for indicating whether socket assembly 103 is either in an open or closed position. In one position (i.e. when flag 303 extends away from spring-loaded plunger 201, 301) socket assembly 103 is opened; in another position (i.e. when flag 303 extends 90 degrees in the opposite direction towards spring-loaded plunger 201, 301), towards spring-loaded plunger 201, 301 socket assembly 103 is closed.

All the components mentioned above are housed in tube 205, 305 which is attachable to heat sink 401 by a roll pin (not shown).

The assembly is operational as follows. Once spring-loaded plunger 201, 301 engages socket element 104, spring 306 is compressed causing spring-loaded plunger 201, 301 to travel up into cap 202, 302. The oval-shaped element 307 on spring-loaded plunger 201, 301 then disengages from a similar mating oval-feature in sleeve 204, 304 so spring-loaded plunger 201, 301 is free to rotate, upon rotation of cap 202, 302. Thus, when spring-loaded plunger is compressed on socket element 104 and is rotated, the rotation is translated into a lateral movement of socket assembly 103 from an opened to a closed position, and vice versa.

Figure 5:
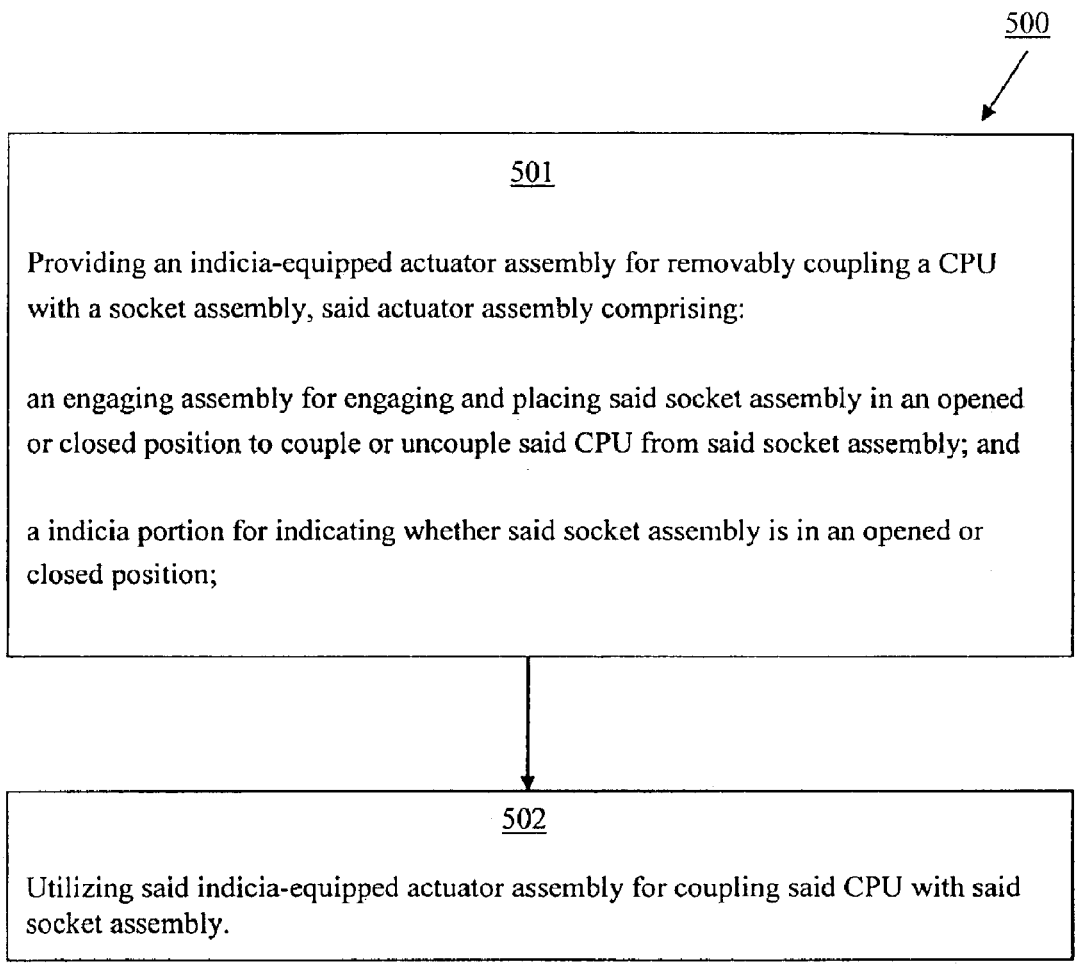
FIG. 5 is method of using the indicia-equipped actuator in accordance with an embodiment of the present invention, for removably coupling a CPU with a socket assembly.

In accordance with the method of FIG. 5, the indicia-equipped actuator assembly of the present invention can be used for of removably coupling a CPU with a socket assembly, by providing indicia-equipped actuator assembly 200, 300 as described above, and operating socket assembly 103 also as indicated above to couple or uncouple a CPU with socket assembly 103 on board 102.

Embodiments of the present invention and how it can be used to couple and or uncouple a CPU from a variety of socket assemblies on a board, of which socket assembly 103 is exemplary, without accidentally causing damage to the CPU, the socket assembly or the socket element is thus described.

As will be appreciated, an advantage of the presently claimed invention is that since the indicia portion e.g. the flag or icon in the window is readily visible, a user, intent on uncoupling the CPU from socket assembly and not directing seeing the position of socket assembly, can rely on the position of the readily visible flag or icon in the window to determine whether the socket assembly is in an opened or closed position. Consequently, if in fact socket assembly is in the locked position with respect to the CPU, the user will be aware of the need to first unlock the socket assembly before pulling on the CPU assembly.

Further, since the flag in an open position will interfere with installation or removal of the heat sink clamps, the user will be notified (compared to the prior art) as to the position of the socket assembly on attempting to couple the CPU/heat sink unit to the socket assembly.

While the present invention has been described in particular embodiments, it should be appreciated that the present invention should not be construed as limited by such embodiments, but rather construed according to the following claims.

What is claimed is:

1. An indicia-equipped actuator assembly for removably coupling a CPU with a socket assembly, comprising:
   an engaging assembly for engaging and placing said socket assembly in an opened or closed position to couple or uncouple said CPU from said socket assembly said engaging assembly comprises a spring-loaded plunger, a sleeve, a cap and a tube; and
   an indicia portion for indicating whether said socket assembly is in an opened or closed position.

2. The actuator assembly of claim 1, wherein said spring-loaded plunger comprises an oval-shaped element that interlocks with said sleeve, for self-centering said spring-loaded plunger with said socket assembly.

3. The actuator assembly of claim 1, wherein said spring-loaded plunger comprises a chamfered end portion for engaging said spring-loaded plunger with said socket assembly.

4. The actuator assembly of claim 1, wherein said spring-loaded plunger comprises a hexagonal radial cross-section portion for removably engaging said cap.

5. The actuator assembly of claim 1, wherein said spring-loaded plunger supports said indicia portion.

6. The actuator assembly of claim 1, wherein said sleeve defines an oval-shaped internal circumference element therein for orienting said spring-loaded plunger with said socket assembly.

7. The actuator assembly of claim 1, wherein said sleeve defines a notch in its sidewall for removably mounting said engaging assembly on a mounting surface.

8. The actuator assembly of claim 1, wherein said cap removably interlocks with a top portion of said spring-loaded plunger.

9. The actuator assembly of claim 1, wherein said cap comprises a bottom portion defining a hex-shaped recess therein for removably engaging said spring-loaded plunger.

10. The actuator assembly of claim 1, wherein said cap defines an opening at a bottom edge portion of said cap for allowing a 90 degree angular motion of said indicia portion.

11. The actuator assembly of claim 1, wherein said tube comprises a housing for housing said actuator assembly.

12. The actuator assembly of claim 11, wherein said housing defines a window for allowing a 90 degree angular motion of said indicia portion and for viewing locked and unlocked icons on said engaging assembly.

13. The actuator assembly of claim 11, wherein said housing defines a notch for mounting said actuator to a mounting surface on a mounting surface.

14. The indicia-equipped actuator assembly of claim 1, wherein said indicia portion comprises a flag.

15. The indicia-equipped actuator assembly of claim 1, wherein said indicia portion comprises an icon.

16. The indicia-equipped actuator assembly of claim 14, wherein said indicia in a position will hinder coupling of said CPU with a CPU heat sink.

17. The indicia-equipped actuator assembly of claim 1, wherein said socket assembly comprises a fixed-type socket assembly.

18. The indicia-equipped actuator assembly of claim 1, wherein said socket assembly comprises a slideable-type socket assembly.

19. A method of removably coupling a CPU with a socket assembly, the method comprising:

providing an indicia-equipped actuator assembly for removably coupling a CPU with a socket assembly, said actuator assembly comprising:

an engaging assembly for engaging and placing said socket assembly in an opened or closed position to couple or uncouple said CPU from said socket assembly said engaging assembly comprises a spring-loaded plunger, a sleeve, a cap and a tube; and a indicia portion for indicating whether said socket assembly is in an opened or closed position; and utilizing said indicia-equipped actuator assembly for coupling said CPU with said socket assembly.

20. The method of claim 19, wherein said spring-loaded plunger comprises an oval-shaped element that interlocks with said sleeve, for self-centering said spring-loaded plunger with said socket assembly.

21. The method of claim 19, wherein said sleeve defines an oval-shaped internal circumference element therein for orienting said spring-loaded plunger with said socket assembly.

22. The method of claim 19, wherein said cap removably interlocks with a top portion of said spring-loaded plunger.

23. The method of claim 19, wherein said tube defines a window for viewing locked and unlocked icons on said engaging assembly.

* * * * *